A. ARMSTRONG.
Grain-Drill.

No. 57,842. Patented Sept 11, 1866.

Witnesses:
F. A. Jackson
Wm Truss

Inventor:
A Armstrong
Per Munn & Co
Attorney

UNITED STATES PATENT OFFICE.

A. ARMSTRONG, OF GILLESPIE, ILLINOIS.

IMPROVEMENT IN WHEAT-DRILLS.

Specification forming part of Letters Patent No. 57,842, dated September 11, 1866.

*To all whom it may concern:*

Be it known that I, AARON ARMSTRONG, of Gillespie, in the county of Macoupin and State of Illinois, have invented a Combined Wheat-Drill and Roller; and I do hereby declare that the following is a full, clear, and exact description thereof, reference being had to the accompanying drawings, forming part of this specification.

The nature of my invention consists in so constructing a machine that wheat may be sowed in drills and the same machine be used for a corn-planter, and is also provided with rollers, so as to roll the land after the planter.

This machine is so constructed and arranged as to perform the functions of planter or sowing the various kinds of grain and rolling the ground in the most perfect and satisfactory manner.

To enable others skilled in the art to make and use my invention, I will proceed to describe its construction and operation.

Figure 1:
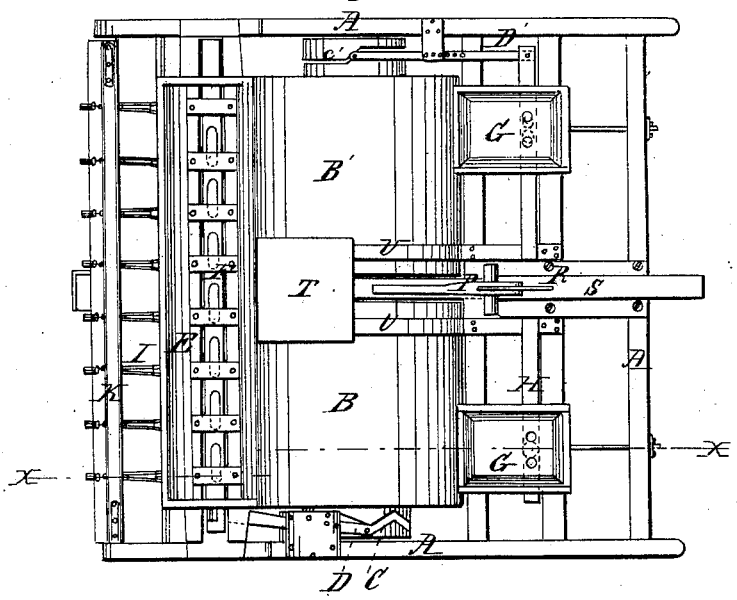
Figure 2:
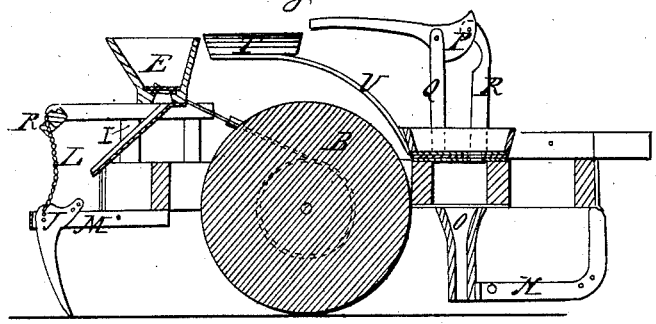

Figure 1 is a top-plan view of my improved planter and roller. Fig. 2 is a transverse sectional elevation taken from the line $x$ $x$.

Letters of like name and kind refer to like parts in each of the figures.

A is a rectangular frame, made of wood and mounted on two rollers, B B'. These rollers run in suitable bearings secured or made in the frame A. Upon the outer end of these rollers and inside of the frame are secured cams C' and C, in which works a lug which is attached to the levers D and D', which are attached, respectively, to the slides in the bottom of the seed-boxes.

E is the seed-box of the wheat-drill, in the bottom of which is the slide F, that regulates the flow of seed to the ground. G G are two seed-boxes, located upon the frame A, forward of the rollers, in the bottom of which are slides H, that are connected to the lever D', that works in the cam C'.

The slide F is attached to the lever D, which also works in the cam C and gives motion to the slide F.

I are spouts connected to the seed-box, which conduct the seed to the rear of the seed-box and down to the plows J, which are suspended to a rock-beam, K, by means of jack-chains L. These plows are hung between two bars, M, and have a bearing upon a wooden pin, so that if the plow comes in contact with any obstruction the pin breaks and lets the plow turn back and over the obstruction, and saves the plow from breaking.

N is a pair of runners at the forward end of the frame, that mark for the row of corn when the planter is used. O is a tube leading down from the seed-box to the rear end of the runners. P is a lever secured by a joint in the standard Q, and connects with a lever, R, that connects with the rear end of the pole, for the purpose of raising the runners from the ground when desired. T is the driver's seat, secured to the spring-braces U U, which are secured to the frame A.

The operation of my combined machine is easy and perfect, and so arranged that either portion of it may be used at a time or all at the same time, as may be desired.

Having described my invention, what I claim as new, and desire to secure by Letters Patent of the United States, is—

1. The levers P and R, together with the post or standard Q, in combination with the pole S, for the purpose of raising the runners from the ground, for the purposes and substantially as described.

2. The cams C and C', in combination with the levers D D' and slides F and H, the cams C and lever D having a continuous alternate motion, and the cam C' and lever D' having an intermittent motion, for the purposes and substantially as set forth.

AARON ARMSTRONG.

Witnesses:
J. D. MARTIN,
GEORGE FRANCIS.